United States Patent [19]
Schneider

[11] Patent Number: 6,056,360
[45] Date of Patent: May 2, 2000

[54] ADJUSTABLE LUMBAR SEAT SUPPORT

[75] Inventor: William E. Schneider, Dandridge, Tenn.

[73] Assignee: American Components, Inc., Dandridge, Tenn.

[21] Appl. No.: 09/115,060

[22] Filed: Jul. 14, 1998

Related U.S. Application Data

[63] Continuation-in-part of application No. 08/665,009, Jun. 17, 1996, abandoned, application No. 08/827,808, Apr. 11, 1997, Pat. No. 5,806,927, and application No. 09/067,205, Apr. 28, 1998, abandoned.

[51] Int. Cl.[7] .................................................. A47C 3/025
[52] U.S. Cl. ..................................... 297/284.4; 297/284.8
[58] Field of Search ............................. 297/284.4, 284.8, 297/452.49, 452.52; 267/160, 42; 248/576, 614, 618

[56] References Cited

U.S. PATENT DOCUMENTS

| | | |
|---|---|---|
| 134,853 | 1/1873 | Cliff . |
| 162,165 | 4/1875 | Godley . |
| 759,507 | 5/1904 | Ericson . |
| 1,153,058 | 9/1915 | Gilfillan . |
| 4,567,615 | 2/1986 | Fanti . |
| 5,076,643 | 12/1991 | Colasanti et al. . |
| 5,190,348 | 3/1993 | Colasanti . |
| 5,462,335 | 10/1995 | Seyler ............................. 297/284.8 X |
| 5,567,011 | 10/1996 | Sessini ........................... 297/284.4 X |

*Primary Examiner*—Anthony D. Barfield
*Attorney, Agent, or Firm*—Pitts & Brittian, P.C.

[57] ABSTRACT

An adjustable lumbar support device for installation within seats, and particularly vehicular seats, to enable a seat occupant to adjust a seat back to provide a desired amount of support for the lumbar region of the back. The adjustable lumbar seat support includes a pair of leaf spring members which are joined at their opposite edges with hinge members. Application of pressure to or release of pressure from the hinge members causes movement of the leaf members and a corresponding change in the central spacing between the leaf spring members such that the adjustable lumbar seat support is expanded or contracted. A flexion control device is provided to variably regulate the expansion and contraction of the hinge members such that the central spacing between the leaf spring members is changed and the adjustable lumbar seat support is expanded or contracted as desired. An actuator is also provided to enable the effortless operation of the flexion control device and use the adjustable lumbar seat support.

5 Claims, 9 Drawing Sheets

ADJUSTABLE LUMBAR SEAT SUPPORT

This continuation-in-part application discloses and claims subject matter disclosed in my earlier filed application Ser. No. 08/665,009, filed on Jun. 17, 1996 now abandoned; Ser. No. 08/827,808, filed on Apr. 11, 1997, and which issued as U.S. Pat. No. 5,806,927 on Sep. 15, 1998, and Ser. No. 09/067,205, filed on Apr. 28, 1998, which is now abandoned.

TECHNICAL FIELD

The present invention relates generally to seats, including vehicular seats. More particularly, the present invention relates to an insert for seats that provides adjustable lumbar support to a seat occupant.

BACKGROUND ART

It is well-recognized that a person sitting in a seat for an extended time period may desire additional support to obtain greater seat comfort and/or alleviate seat discomfort. Vehicle operators, vehicle passengers, and people whose jobs require them to be seated for extended periods of time are typically chief among those individuals who seek such additional support. The support is typically desired to provide greater comfort in the lower or the lumbar region of the back. As used herein, the term "seat" applies to a variety of seat structures, including chairs and vehicular seats.

The discomfort problem has been addressed in the prior art in several ways. A simple, although not complete, solution is to utilize a pillow placed low in the seat against the back thereof. By configuring the pillow into different shapes, a variation in lumbar support can be achieved. More permanent solutions to lumbar support problems have also been addressed, for example, in U.S. Pat. No. 5,076,643 issued to A. Colasanti, et al., on Dec. 31, 1993; and U.S. Pat. No. 5,190,348 issued to A. Colasanti on Mar. 2, 1993.

Each of the Colasanti devices requires that a rigid mounting plate be positioned within the seat. In the '643 patent, a semi-flexible contoured plate is secured to the mounting plate and an inflatable bladder is positioned between the mounting plate and the contoured plate against which a user rests. The mounting plate is secured to the seat frame using a plurality of helically shaped springs. The bladder is fixed to the both the mounting plate and the contoured plate, using VELCRO©, to create an operational unit. A valve is also connected the bladder to permit air to enter or exit the bladder or, when closed, to stabilize the pressure within the bladder and, consequently, to stabilize the support given by the device. The pressure in the bladder is adjusted to give the desired support by varying the spacing between the contoured plate and the mounting plate. Use of the semi-contourable plate in the '643 device, especially in a well-used or worn seat, will render the passenger uncomfortable during longer travel as the plate edges will create discomfort. Repeated use of the seat back will result in a strain on the helical mounting springs which will cause the '643 device to mis-position and reduce its operative effectiveness. Repeated use of the bladder will also cause fatigue to the perimeter of the bladder, failure of the bladder's walls and, ultimately, result operational failure of the device.

The '348 device includes a contoured plate which is mounted on the mounting plate and contained within an enclosure formed by the sealing of the inflatable bladder onto the mounting plate. As with the '643 device, the bladder of the '348 device is similarly connected to a valve which permits air to enter or exit the bladder or, when closed, stabilize the pressure within the bladder and, thus, stabilize the support given by the device. However, the '348 device fails to completely address the need for an adjustable lumbar support device. Through repeated use, the employment of a spring metal contour plate proximate the bladder surface insures that the '348 device will eventually be rendered useless as the edges of the metal plate will wear through the bladder surface. Repeated use or defective securement can cause failure of the connective seam between the bladder and the mounting plate. Moreover, such repeated use or defective securement can also cause dissociation of the contour plate from the mounting plate.

Both of the devices described in the '643 and '348 patents are of complex construction and require substantial time and cost for fabrication and installation. The requirements for the installation of a mounting plate, as well as the inter-securement of the bladder and plate elements, are primary reasons for the high cost, complexity of construction and the need of substantial time for the manufacture and installation of each device. Both of the devices are also structurally and functionally dissimilar from the present invention.

Other devices may appear to be integrable with either or both of the Colasanti devices and, in combination, appear similar to the device of the present invention. However, none of these devices, whether viewed independently and/or in combination with either or both of the Colasanti devices, resemble the present invention such that its conception would be obvious to one skilled in the art. Among these other devices are those disclosed in U.S. Pat. No. 134,853 issued to E. Cliff on Jan. 14, 1873; U.S. Pat. No. 162,165 issued to G. F. Godley on Mar. 4, 1875; and, U.S. Pat. No. 4,567,615 issued to H. Fanti on Feb. 4, 1986.

The '853 patent to Cliff and the '165 patent to Godley disclose spring leaf devices for vehicles, which are distinguishable by their very purpose. Unlike the present invention, the Cliff device incorporates a plurality of layered, industrial strength spring leaves in its overall structure. The Cliff device also includes hinge members which must be secured to either bearing blocks or clip connections for effective operation. Moreover, the Cliff device fails to provide any means for the manual or automated regulation of its overall expansion or contraction.

The Godley device utilizes a pair of blocks disposed on opposite ends of a bolt. The blocks receive the ends of a series of retroverted springs or spring leaves and cooperate with the bolt to delimit the bounds of movement for the springs. The springs or spring leaves, independently or with the assistance of a helical spring positioned about the bolt, pre-dispose the blocks to an extreme position. In operation, the blocks oscillate along the bar depending on the degree of force exerted on them. Neither the Cliff device nor the Godley device is designed to be disposed in a seat or seat system. Neither the Cliff device nor the Godley device is designed to provide lumbar support for a seat occupant. Further, both the Cliff and the Godley devices fail to provide any means for manual or automated regulation of their overall expansion or contraction.

The Fanti device discloses a spring-slat arrangement for a bed frame which includes mounting supports for mounting onto the longitudinal beams of a bed frame and a series of pairs of slats which are received in the mounting supports in a perpendicular relation to the beams. The Fanti device further includes an elastic strap which is centrally disposed on the slats and which runs along the straps in a parallel orientation to the beams. As with both Cliff and Godley, the Fanti device is not designed to be disposed in a seat or seat system. Nor is the Fanti device designed to provide lumbar support for a seat occupant. Similarly, Fanti fails to provide any means for manual or automated regulation of its overall expansion or contraction. Consequently, it is neither obvious to one skilled in the art to combine any of these referenced to produce the subject matter of the present invention, nor does the combination of these references result in a device which approximates the structure and/or the function of the present invention.

Accordingly, it is an object of the present invention to provide an adjustable lumbar seat support for seats that can be installed with a minimum of labor.

It is also an object of the present invention to provide an adjustable lumbar seat support that does not require a separate mounting plate.

It is another object of the present invention to provide an adjustable lumbar seat support which is regulable using different regulation mechanisms.

Further, it is an object of the present invention to provide an adjustable lumbar seat support which is of durable construction, yet easy to manufacture.

These and other objects of the present invention will become apparent upon a consideration of the drawings referred to hereinafter, and a complete description thereof

DISCLOSURE OF THE INVENTION

In accordance with the present invention there is provided an adjustable lumbar support for seats, such as chairs and vehicular seats. The adjustable lumbar seat support includes a pair of leaf spring members which are joined at their opposite edges by hinge mechanisms. The leaf spring members and the hinge mechanisms cooperate to define a volume between the leaf spring members. The application of pressure to or the release of pressure from the hinge mechanisms cause movement of the leaf members. Movement of the leaf spring members changes the volume defined by the leaf spring members such that the adjustable lumbar seat support is expanded or contracted. The length of each leaf spring member along each hinge mechanism, and the distance between the hinge mechanisms varies depending upon the size of the seat into which the support is to be placed. A flexion control device enables variable regulation of the pressure applied to the hinge mechanisms and the corresponding change in the volume defined by the leaf spring members. An actuator facilitates operation of the flexion control device and enables the discrete selection of a desired lumbar seat support position.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

An adjustable lumbar seat support incorporating various features of the present invention is illustrated generally at 10 in the figures. The adjustable lumbar seat support 10 provides a lumbar support mechanism which is easily integrable into new or existing seat structures with minimal efforts and at minimal costs. Moreover, in the preferred embodiment, the adjustable lumbar seat support 10 enables discrete regulation of the degree of seat support provided to an individual's lumbar spine area and, thereby, maximizes the individual's comfort while occupying a seat.

Figure 1:
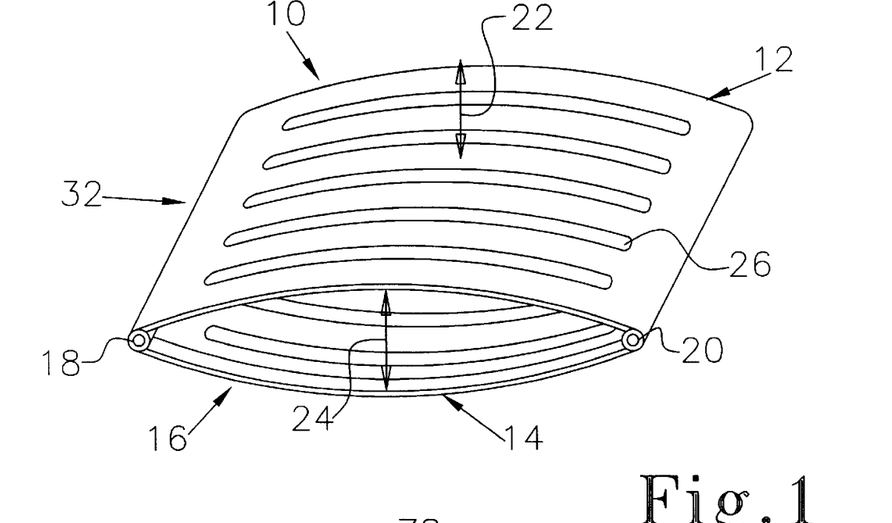
FIG. 1 is an isometric drawing of one embodiment of leaf spring members according to the present invention.
Figure 2:
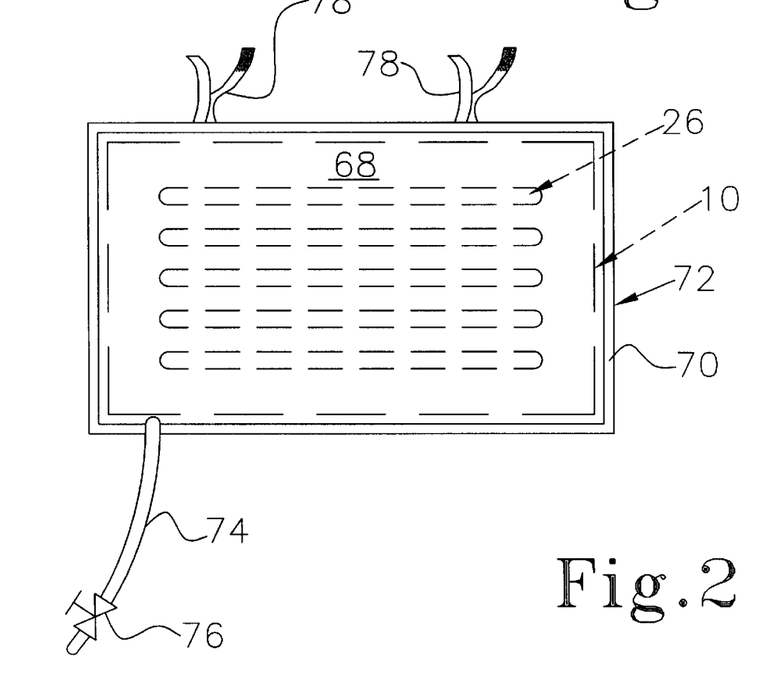
FIG. 2 is a drawing illustrating the encapsulation of the leaf spring members of FIG. 1 into a bladder.
Figure 3:
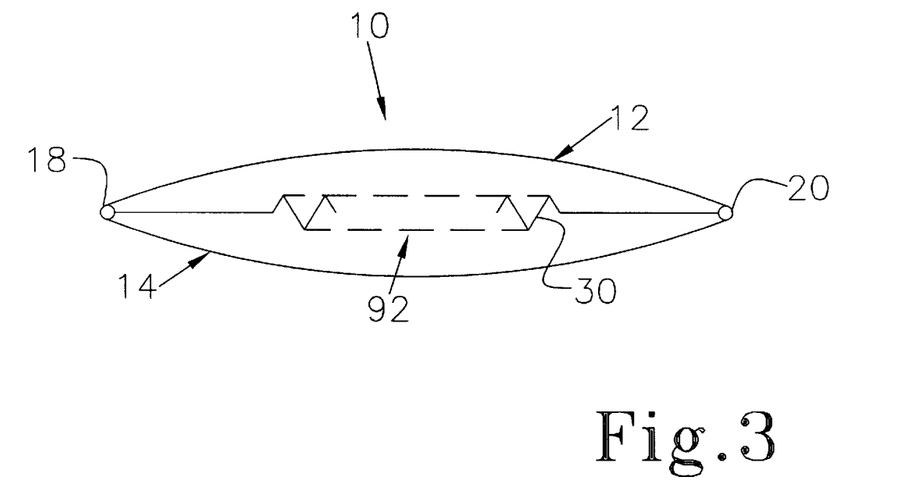
FIG. 3 is an embodiment that is a slight variation of FIG. 1.

FIG. 1 illustrates one configuration of leaf spring members 12, 14 used to achieve lumbar support for a seat. In this embodiment, the leaf spring members 12, 14 are arcuate in configuration so that when opposite edges are joined, a generally ellipsoidal volume 16 is formed therebetween. The two leaf spring members 12, 14 are joined at their opposite edges with hinge mechanisms 18, 20 to form a leaf spring combination 32. In this manner, pivotal movement is permitted when pressure is applied to or released from leaf spring members 12, 14 as indicated by double-ended arrow 22. Such pressure application or release then changes the volume defined by the leaf spring members 12, 14 as indicated by the double-ended arrow 24. One method of providing such variable flexion is through the employment of a bladder 68 disposed about the leaf spring combination 32, as shown in FIG. 2. Another is through employment of a biasing member 30, as illustrated in FIG. 3.

Typically, the leaf spring members 12, 14 are fabricated from semi-flexible material such as a plastic. Typically, this can be ACETEL™. In the embodiment illustrated in FIG. 1, and that shown in phantom in FIG. 2, each of these leaf spring members 12, 14 are fabricated from slotted material, with the slots 26 running in a direction perpendicular to the hinge mechanisms 18, 20. The lengths of the spring members 12, 14 along the hinge mechanisms 18, 20, and the distance between the hinge mechanisms 18, 20, are chosen for a specific size of lumbar support, this depending upon the size of the seat or location within the seat into which the support is to be placed. The slots 26, similarly, are chosen for the specific style and purpose of the lumbar support being fabricated. Accordingly, it will be recognized that slot size and slot configuration can vary depending on the intended use of the adjustable lumbar seat support 10.

Figure 4:
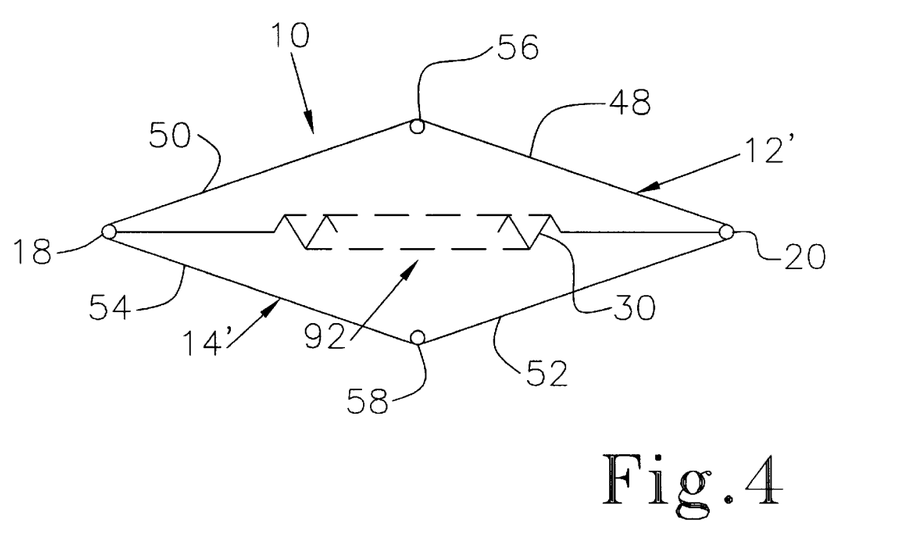
FIG. 4 is a drawing illustrating the divided leaf spring members and divided leaf spring hinge mechanisms of the present invention.
Figure 5:
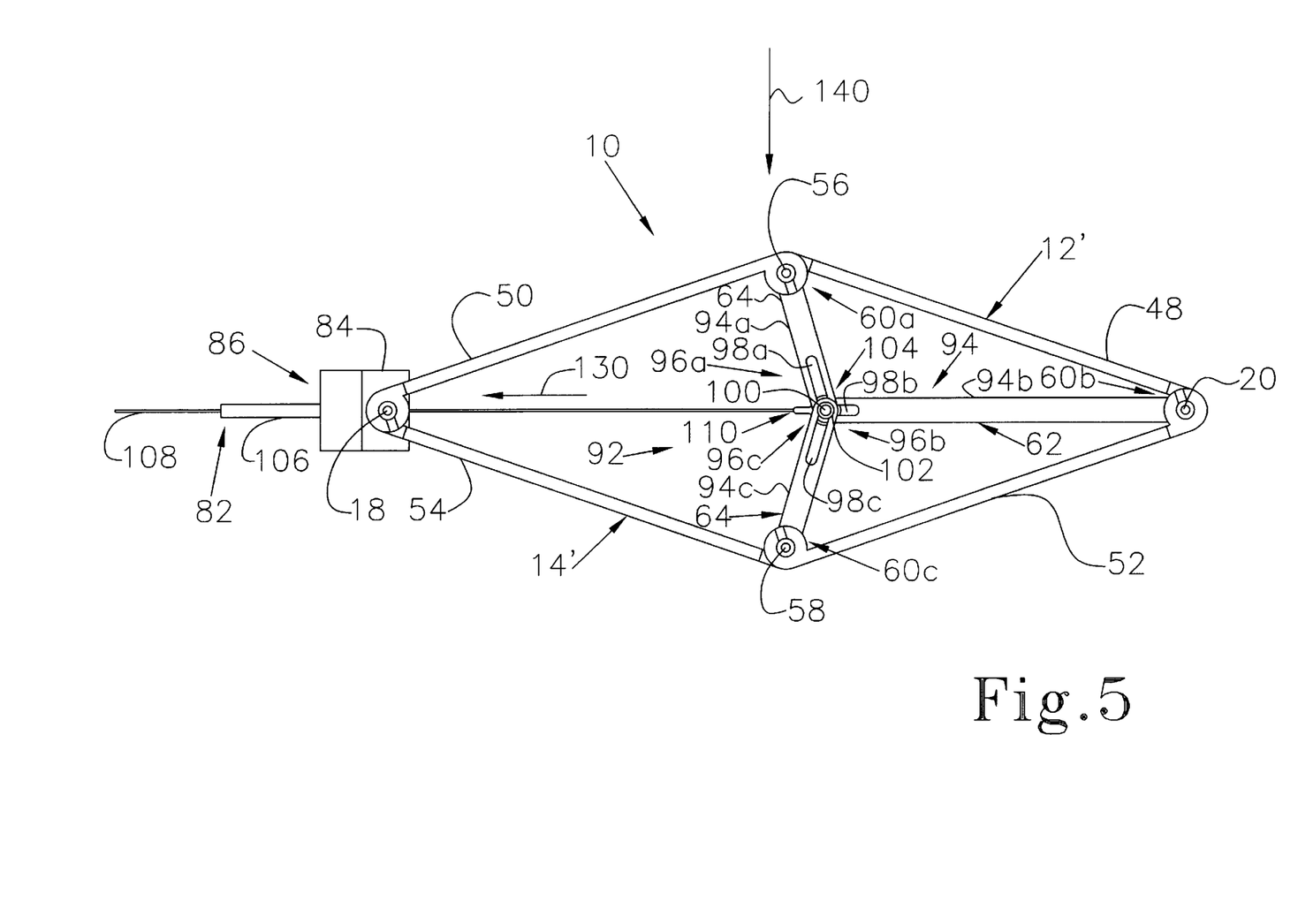
FIG. 5 is an end elevation view of another embodiment of the present invention in an open or extended position.

FIGS. 4–9 illustrate different configurations of another embodiment of the present invention. In each configuration, leaf spring members 12', 14' are divided into sections 48, 50, and 52, 54, as best illustrated in FIGS. 4 and 5. Sections 48,

50 are joined by a divided leaf hinge mechanism 56. Sections 52, 54 are joined by a divided leaf hinge mechanism 58. It is foreseeable that leaf spring members 12', 14' are divisible into sections of unequal proportion, and that the embodiments of FIGS. 3 and 4 can be combined to include a continuous leaf spring member 12 along one surface, and a divided leaf spring member 14' along the second surface. Preferably, however, the leaf spring members 12', 14' are equally dimensioned.

Figure 6:
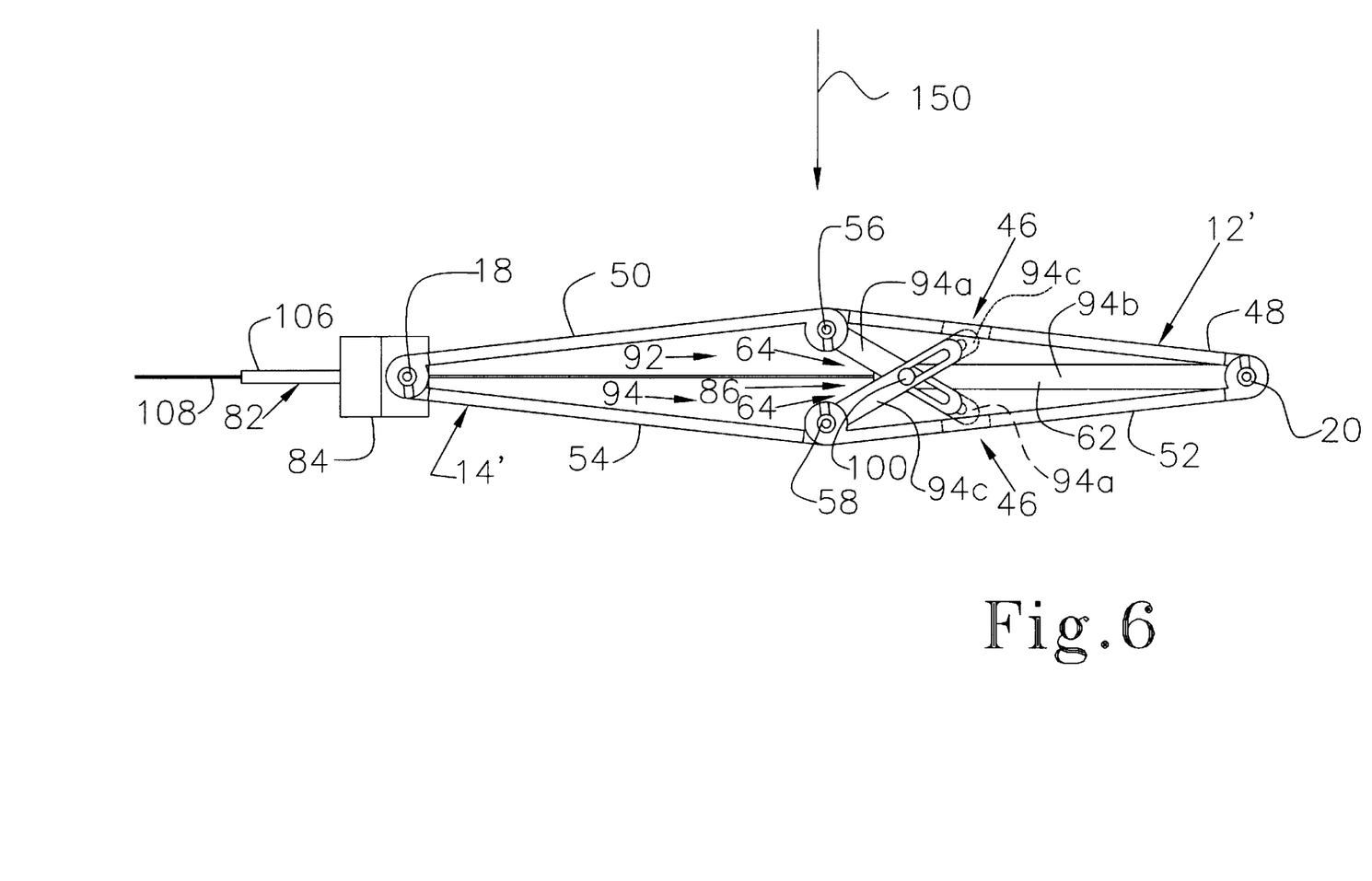
FIG. 6 illustrates an end elevation view of the embodiment depicted in FIG. 5, in an closed or contracted position.
Figure 8:
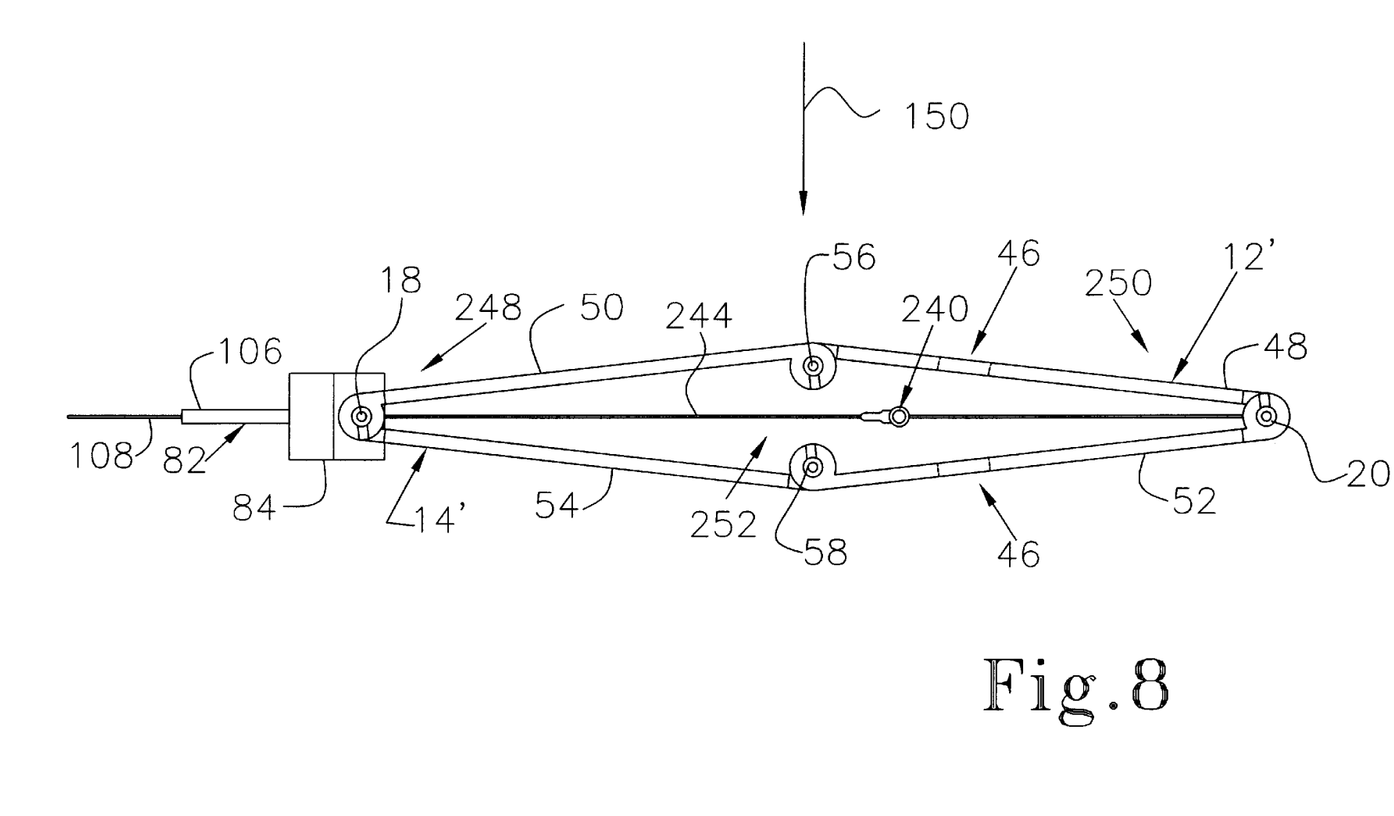
FIG. 8 illustrates an end elevation view of the embodiment depicted in FIG. 7, in an closed or contracted position.

In each configuration, leaf spring members 12', 14' further include slots 26, as discussed above, and/or openings 46. The openings 46 are utilized for facilitating operation of the adjustable lumbar support 10, as shown in FIGS. 6 and 8, and/or for reducing manufacturing costs without sacrificing the structural integrity of the support 10. Preferences for the use of slots 26 and/or openings 46, and their disposition on the support, will vary depending on the intended use of the support.

Figure 7:
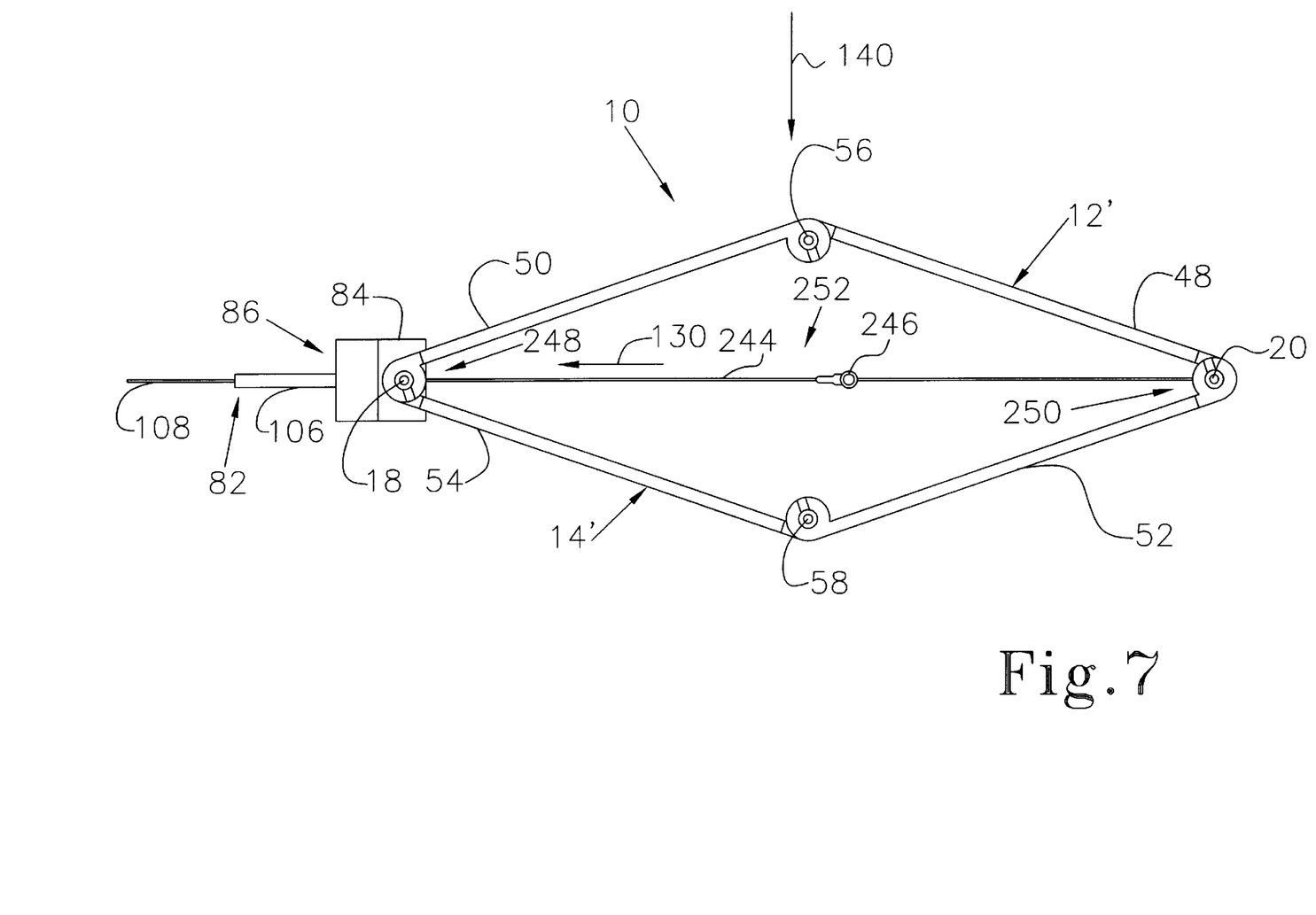
FIG. 7 is an end elevation view of the preferred embodiment of the present invention in an open or extended position.

A flexion control device 92 is disposed between the leaf spring members 12', 14' to variably regulate the degree of leaf flexion and, consequently, the degree of lumbar support provided by the adjustable lumbar seat support 10. As illustrated in FIGS. 3 and 4, the flexion control device 92 is a biasing member 30, such as a spring, which joins hinge mechanisms 18, 20 and automatically biases leaf spring members 12', 14' in an open or extended position. As illustrated in FIGS. 5–9, the flexion control device 92 is a composite structure disposed between hinge mechanisms 18, 20 and divided leaf hinge mechanisms 56, 58. And, in the preferred embodiment, as illustrated in FIGS. 7 and 8, the flexion control device 92 is an inter-leaf cable 244 which extends between hinge mechanisms 18, 20 and leaf spring members 12', 14'.

The flexion control device 92 illustrated in FIG. 5 includes a trinal extensor 94 having three trinal extensor members 94a, 94b, 94c wherein a first end 96a, 96b, 96c of each extensor member 94a, 94b, 94c defines an extensor slot 98a, 98b, 98c and each slot 98a, 98b, 98c is co-joined by a pivot 100. The pivot 100 functions to maintain the extensor slot 98a, 98b, 98c of each extensor member 94a, 94b, 94c in close proximity to each other and facilitate the opening and closure of the lumbar seat support 10. In the embodiment shown in FIG. 5, the pivot 100 is a rod having a threaded end 102 for receiving a nut 104 to secure the slotted ends 96a, 96b, 96c of the trinal extensor members 94a, 94b, 94c. Those skilled in the art will recognize that other suitable devices, including rivets, snap-rings, and other similar devices, can be employed as a pivot 100 and function with effectiveness equivalent to the pivot 100 and nut 104 assembly described herein.

As also illustrated in FIG. 5, trinal extensor member 94a includes a second end 60a opposite first end 96a. Trinal extensor member 94b also includes a second end 60b opposite first end 96b. Similarly, trinal extensor member 94c includes a second end 60c opposite first end 96c. Each second end 60a, 60b, 60c of each trinal extensor member 94a, 94b, 94c is received and positioned between leaf spring members 12', 14' such that the pivot 100 is centrally located between the leaf spring members 12', 14' when the leaf spring members 12', 14' are opened. The second end 60a of trinal extensor member 94a is centrally disposed on divided leaf hinge member 56, the second end 60c of trinal extensor member 94c is centrally disposed on divided leaf hinge member 58, and the second end 60b of trinal extensor member 94b is centrally disposed on hinge mechanism 20 of the leaf spring members 12', 14'.

In an open or extended position, as illustrated in FIG. 5, the pivot 100 engages each trinal extensor member 94a, 94b, 94c at one extreme of its respective extensor slot 98a, 98b, 98c. In a closed or retracted position, as illustrated in FIG. 6, the pivot 100 slidably moves to the opposite extreme of each trinal extensor slot 98a, 98b, 98c and a portion of the first end 96a, 96b, 96c of each trinal extensor member 94a, 94b, 94c enters, but does not protrude from opening 46 disposed in each leaf spring member 12', 14'. This construction permits the maximal closure of the leaf spring members 12', 14' without risk of compromise of any elements surrounding the combination 32.

In the embodiment illustrated in FIGS. 5 and 6, the trinal extensors 94a, 94b, 94c of the flexion device 92 are of differing lengths such that a longer extensor member 62 is disposed between two shorter extensor members 64, each of the shorter extensor members 64 being of equal length. Those skilled in the art will recognize that the fabrication of the leaf spring members 12', 14', as described herein, will permit the extension of the leaf spring members 12', 14' such that a square can be formed. However, such a conformation is not preferred as it would likely minimize the comfort experienced by an occupant sitting in a seat have such a lumbar support. The variation of trinal extensor member 94a, 94b, 94c length, as described herein, constrains the leaf spring members 12', 14' to extend to a parallel shaped cross-section at its maximum and obviates the possibility of such discomfort.

The flexion control device 92 of the preferred embodiment is an inter-leaf cable 244 which extends from one of the at least one pair of hinge mechanisms 18, 20 to the other of the pair of hinge mechanisms 18, 20. In the preferred embodiment, the inter-leaf cable 244 includes a first end 248 which extends from hinge mechanism 18 and a second end 250 which is received on to hinge mechanism 20. As also illustrated in FIGS. 7 and 8, in the preferred embodiment, the inter-leaf cable includes a cable stop 246 for delimiting the movement of the inter-leaf cable 244 and the degree of flexion of the divided leaf members 12', 14'. Accordingly, the cable stop 246 prevents the inter-leaf cable from extending beyond an extreme limit during operation of the adjustable lumbar seat support 10. The cable stop 246 is integrable into the inter-leaf cable 244, as shown in FIGS. 7 and 8, or may be an independently formed stop (not shown) which is securable to the cable 244.

An actuator 66 variably regulates operation of the flexion control device 92 such that the desired discrete position of the adjustable lumbar seat support 10 is facilely found. In the embodiment shown in FIG. 9, the actuator 66 is a bladder 68 which acts in conjunction with the leaf spring combination 32 that it closely encompasses. In this embodiment, the leaf spring combination 32 includes a biasing member 30 and the bladder 68 is typically fabricated from polyurethane. The bladder 68 further includes a seal 70 disposed about its perimeter 72 to insure the integrity of the overall adjustable lumbar seat support 10 structure. A tubing 74 communicates with the interior of the bladder 68 thereby permitting a change in air volume within the bladder 68. This tubing 74 includes a valve 76 to permit the change in this air volume. With the valve 76 open, and no pressure applied to the lumbar support, the leaf spring combination 32 is biased by the biasing member 30 to its maximum extended dimension and air fills the bladder 68. In turn, when the valve 76 is in an open position and pressure is applied against the leaf spring combination 32, air is forced from the bladder 68 and the dimension of the leaf spring combination 32 is varied until a desired lumbar support level is achieved. Closure of the valve 76 then stabilizes the volume of air within the bladder 68 whereby a constant volume of air is held in the bladder 68 and the desired lumbar support is maintained.

Figure 9:
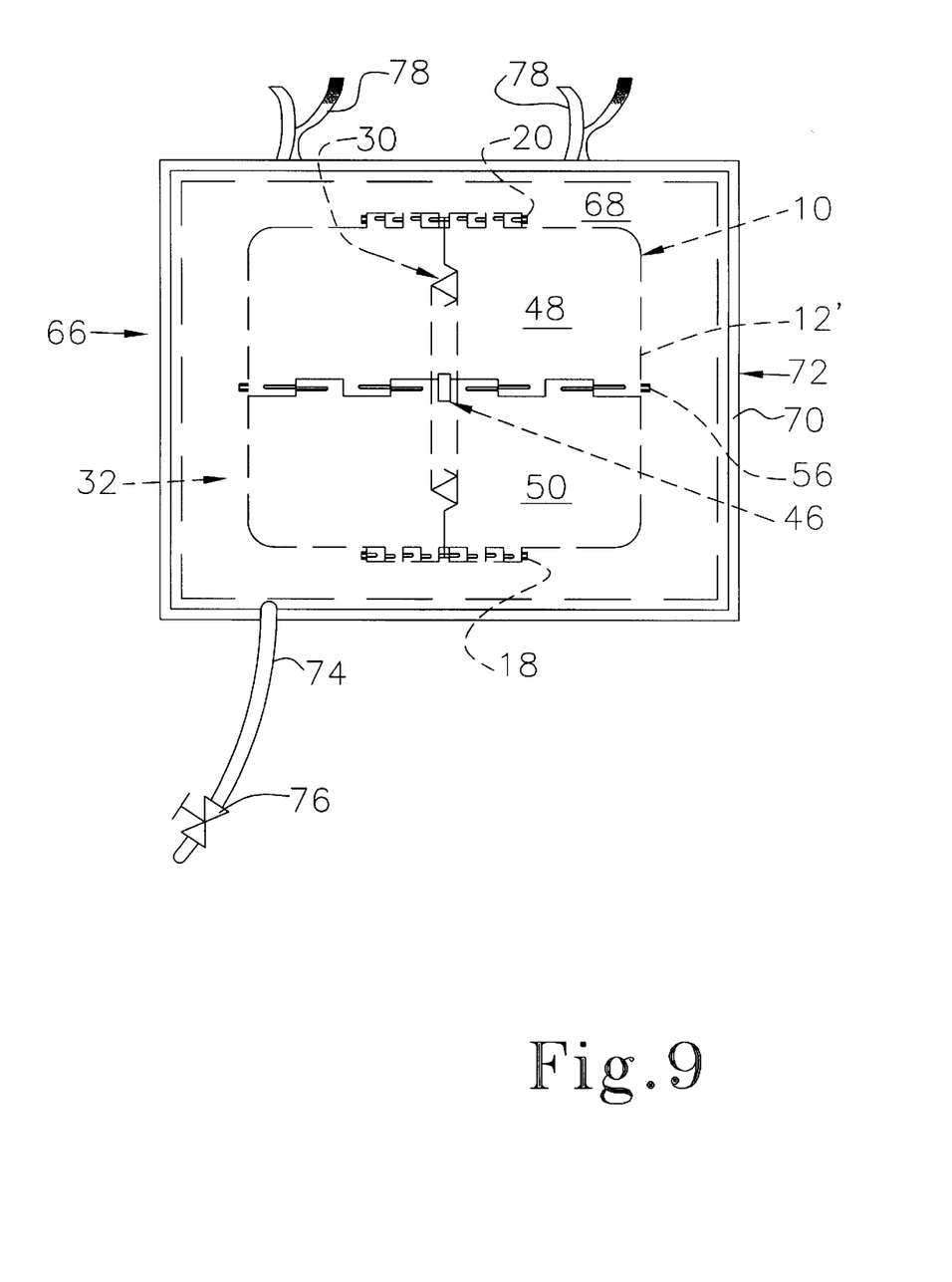
FIG. 9 is a side elevation view, in phantom, of the embodiment shown in FIG. 5, including one type of actuator.

The bladder 68 and the enclosed leaf combination 32 are positionable within a seat back near the junction of the seat back and the seat bottom (in the lumbar region). The rear surface of the adjustable lumbar seat support 10 rests against conventional seat support frame members (Ford, for example, has a grid of rods) within the seat so as to bear against one of the leaf spring members 12', 14' to minimize any movement thereof. Where preferable, restraints 78 are provided to maintain the seat support 10 in place. Such restraints 78 may include straps, hook-and-loop fasteners or other fastening devices as are known in the art. FIGS. 2 and 9 illustrate an embodiment in which two restraints 78 are disposed on one side of its perimeter 72. However, those skilled in the art will recognize that such restraints 78 are also disposable about more than one side of the perimeter 72 of the bladder 68, as is preferable.

Those embodiments of the present invention which do not include a bladder 68, such as the preferred embodiment, are similarly positionable in a seat near the junction of the seat back and the seat bottom. They are also adaptable to include use of restraints 78 for positioning and securement within the seat back. Those skilled in the art will recognize that, in these embodiments, it is necessary to secure the adjustable lumbar support 10 such that it neither travels in the seat back nor pivots during operation such that its support objectives are defeated. Accordingly, it is preferred that such embodiments of the adjustable seat support 10 are secured to the seat back either by securing the support 10 to the seat back at cable guide 84 or, by use of fasteners 78 disposed on or along at least hinge mechanism 18. Other methods of securement which preserve the functionality of the seat support 10 are equally foreseeable.

Figure 10:
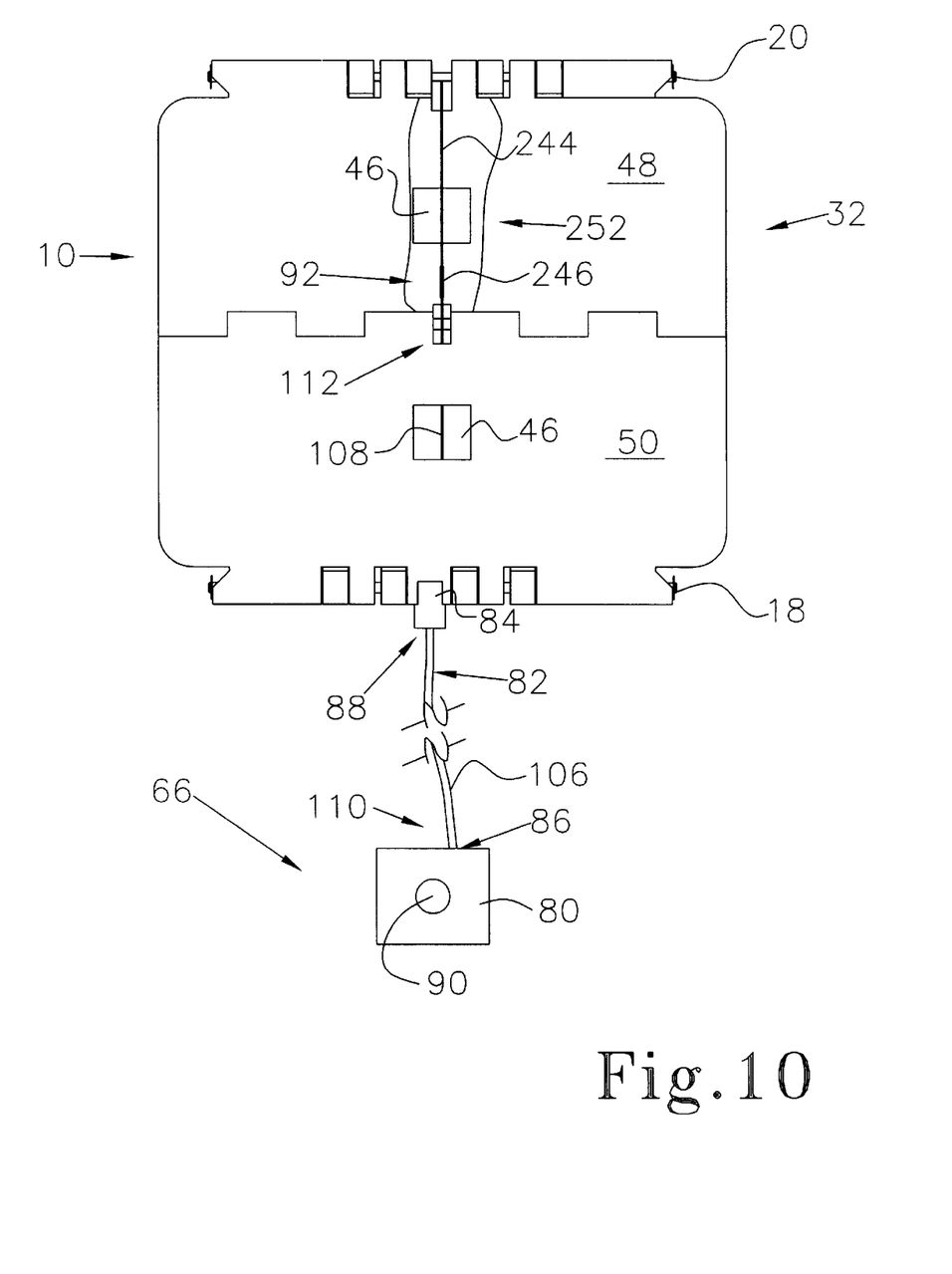
FIG. 10 is a side elevation view of the preferred embodiment illustrated in FIGS. 7 and 8, including a second type of actuator.

As illustrated in FIG. 10, in one preferred embodiment of the adjustable lumbar support, the actuator 66 for the adjustable lumbar seat support 10 is a motor 80. The actuator 66 includes an actuator control 90 and an encased cable 82 disposed between the motor 80 and the adjustable lumbar support 10. The encased cable 82 includes a casing 106 and a cable wire 108 which slidably moves within the casing 106. The casing 106 includes a first end 86 and a second end 88. The cable wire 108 also includes a first end 110 and a second end 112. The first ends 86, 110 of the casing 106 and the cable wire 108 are secured to the motor 80. The second end 88 of the casing is secured to a cable guide 84. The cable wire 108 extends through the second end 88 of the casing 106, and the cable guide 84, and it second end 112 is attachable to first end 248 of the inter-leaf cable 244. The cable guide 84 is secured to the hinge mechanism 18 to facilitate the movement of the cable wire 108 and inter-leaf cable 244 within the leaf spring members 12', 14'. The cable wire 108 and inter-leaf cable 244 of the preferred embodiment are integrally formed such that a single cable 252 extends from the motor 80, through the casing 106 and the cable guide 84 and is secured to hinge mechanism 20. The single cable 252 of the preferred embodiment further includes a cable stop 246 secured to the inter-leaf cable for delimiting the range of motion of the cable 252.

Figure 11:
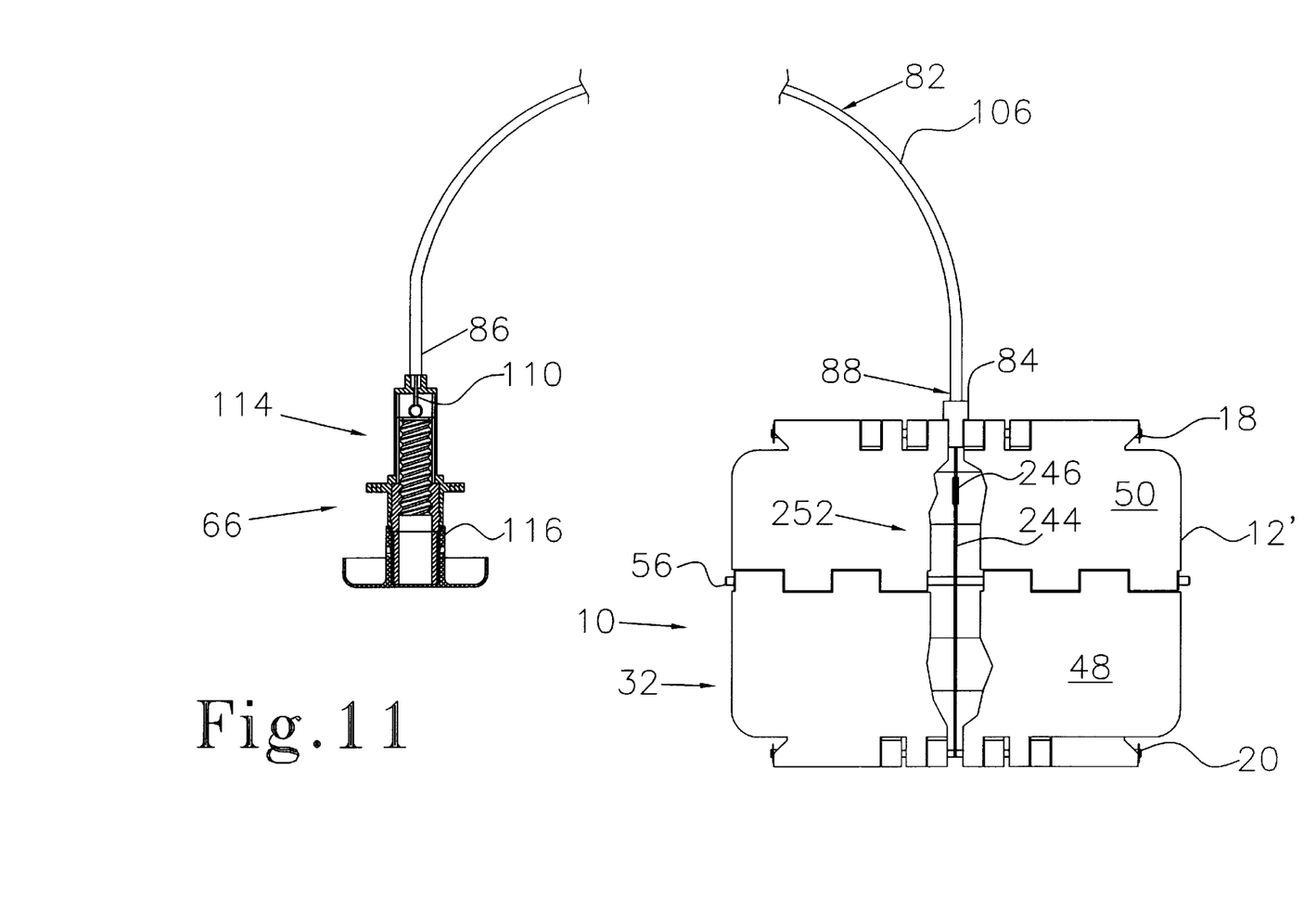
FIG. 11 is a side elevation view of the preferred embodiment illustrated in FIGS. 7 and 8, including a third type of actuator.

As illustrated in FIG. 11, the adjustable lumbar support 10 of the preferred embodiment also functions by use of a manual control 114 such as a handle 116. In this embodiment, the handle 116 receives the second end of the casing 86 and the encased cable 82 such that rotation of the handle 116 moves the cable 82 within the casing 88 and the movement of the cable 82 correspondingly tensions or flexes cable 252 of the adjustable lumbar support 10. In the embodiment illustrated in FIG. 11, the handle 116 is rotatable in both a clockwise and counter-clockwise direction to attain the desired degree of lumbar comfort. Other manual or motorized actuators 66 are foreseeable, as well.

As discussed herein, the cable 252 can be tensioned from an electrically, mechanically or otherwise operated device. In operation, when the cable wire 108 is tensioned, the tension causes hinge member 20 to be drawn toward hinge member 18. The tension force on cable 252 is illustrated by arrow 130 in FIG. 7. As hinge member 20 is drawn toward hinge member 18, divided leaf hinge members 56, 58 are opened or extended outwardly with a force sufficient to overcome the force being exerted against the leaf spring combination 32 and provide adjustable lumbar support to the seat occupant. In FIG. 7, arrow 140 represents the force being exerted against the spring leaf combination 32. When cable tension is released, the pressure exerted against the leaf spring combination 32 causes leaf spring members 12', 14' to retract or close. The pressure exerted against leaf spring combination 32, after the cable tension has been eased, is shown by arrow 150 in FIG. 8.

While a preferred embodiment has been shown and described, it will be understood that it is not intended to limit the disclosure, but rather it is intended to cover all modifications and alternate methods falling within the spirit and the scope of the invention as defined in the appended claims.

I claim:

1. An adjustable lumbar support for providing lumbar comfort to a seat occupant seated in a seat, said adjustable lumbar support comprising:

at least two opposed leaf spring members for providing support to a lumbar region of an occupant seated in a seat, wherein said leaf spring members are continuous and arcuate in configuration whereby an ellipsoidal volume is formed there between said leaf spring members being pivotally connected at opposite edges;

at least one pair of mechanisms hinge each for pivotally connecting said opposite edges of said leaf spring members such that the distance separating said leaf spring members increases as said hinge mechanisms are drawn together;

an inter-leaf cable for selectively regulating the degree of separation between said leaf spring members to obtain a selected support by said lumbar support, wherein said interleaf cable includes a cable stop for delimiting the range of motion of said inter-leaf cable, said inter-leaf cable for flexing said adjustable lumbar support such that said leaf spring members are variably disposable between an open and a closed position, said inter-leaf cable having a first end and a second end, said second end of said inter-leaf cable being received on one of said at least one pair of hinge mechanisms; and an actuating mechanism operatively associated with said first end of said inter-leaf cable for providing selective actuation of said leaf spring members between said open and said closed position such that a desirable support position is facilely found.

2. The adjustable lumbar support of claim 1 further comprising at least one fastening device for joining said lumbar support to frame members of the seat, said fastening device being disposed about a periphery of said lumbar support, said fastening device being selected from the group of fasteners consisting of straps, hooks, and hook-and-loop fasteners.

3. The adjustable lumbar support of claim 2 wherein said actuating mechanism is a motor having an actuator control and an encased cable disposed between said motor and said lumbar support for the motorized operation of said lumbar support, said actuator control being a switch to activate and control the operation of said motor, said encased cable including a casing and a cable wire which slidably moves within said casing, said casing and said cable wire each having a first end and a second end, said first end of each of said casing and said cable being connected to said motor, said second end of said casing being secured a cable guide, said cable guide being received on another of said at least one pair of said hinge mechanisms, said second end of said cable wire being integrally formed with said first end of said inter-leaf cable such that manipulation of said switch activates said motor and operation of said motor imparts movement of said cable wire and inter-leaf cable to flex said leaf members and enable the variable adjustment of said adjustable lumbar support.

4. The adjustable lumbar support of claim 1 wherein said actuating mechanism is a manual actuation control and an encased cable disposed between said manual actuation control and said lumbar support for the manual operation of said lumbar support, said manual actuation control being a handle, said encased cable including a casing and a cable wire which slidably moves said cable wire each had casing and said cable wire each having a first end and a second end, said first end of each of said casing and said cable being connected to said handle, said second end of said casing being secured a cable guide, said cable guide being received on another of said at least one pair of hinge mechanisms, said second end of said cable wire being integrally formed with said first end of said interleaf cable such that manipulation of said handle imparts movement of said cable wire and inter-leaf cable to flex said leaf members and enable the variable adjustment of said adjustable lumbar support.

5. An adjustable lumbar support for providing lumbar comfort to a seat occupant seated in a seat, said adjustable lumbar support comprising:

at least two opposed leaf spring members, said leaf spring members being configured to provide a variable volume there between;

at least one pair of hinge mechanisms, one hinge mechanism each for joining a pair of opposite edges of said leaf spring members, each of said leaf spring members being divided, adjoining edges of said divided leaf spring members being joined by divided leaf hinge mechanisms whereby an angularly shaped volume is formed there between when said leaf spring members are joined at said hinge mechanisms such that the distance separating said leaf spring members increases as said hinge members are drawn together;

an inter-leaf cable member for variably adjusting said leaf spring members to obtain a selected support by said lumbar support, said inter-leaf cable member being positioned within said volume formed by said leaf spring members, said inter-leaf cable including a cable stop received on said inter-leaf cable for delimiting the range of motion of said inter-leaf cable, said inter-leaf cable having a first end and a second end wherein said second end is received on one of said at least one pair of hinge mechanisms; and an actuating mechanism operatively associated with said first end of said inter-leaf cable for operating said inter-leaf cable, said actuating mechanism being motorized for enabling the automated operation of said adjustable lumbar support, said actuating mechanism including a motor having an actuator control and an encased cable disposed between said motor and said lumbar support, said actuator control being a switch to activate and control the operation of said motor, said encased cable including a casing and a cable wire which slidably moves within said casing, said casing and said cable wire each having a first end and a second end, said first end of each of said casing and said cable being connected to said motor, said second end of said casing being secured a cable guide, said cable guide being received on another of said at least one pair of hinge mechanisms, said second end of said cable wire being integrally formed with said first end of said inter-leaf cable such that manipulation of said switch activates said motor and operation of said motor imparts movement of said cable wire and inter-leaf cable to flex said leaf members and enable the variable adjustment of said adjustable lumbar support.

* * * * *